Dec. 28, 1954     C. FARROW     2,697,936
SUPERSONIC TESTING OF HOT ARTICLES
Filed April 2, 1948     4 Sheets-Sheet 1

INVENTOR.
CECIL FARROW
BY *Richey + Watts*
ATTORNEYS

INVENTOR.
CECIL FARROW
BY Richey + Watts
ATTORNEYS

Dec. 28, 1954 C. FARROW 2,697,936
SUPERSONIC TESTING OF HOT ARTICLES
Filed April 2, 1948 4 Sheets-Sheet 3
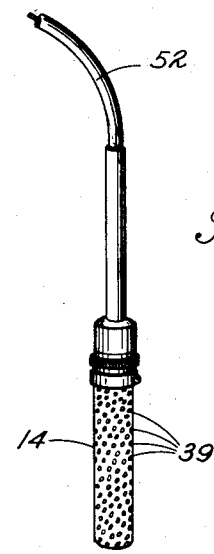
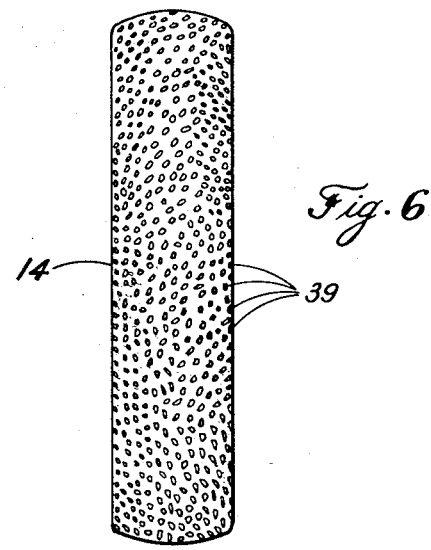
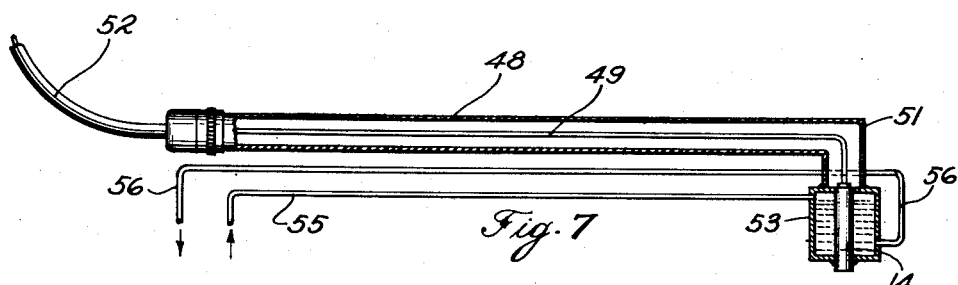
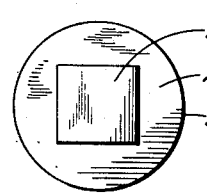
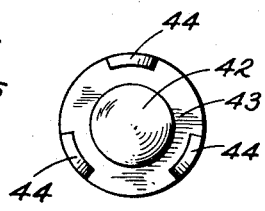
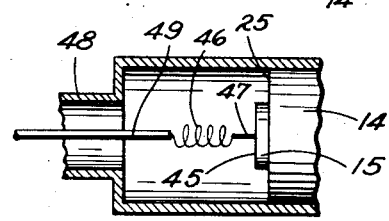
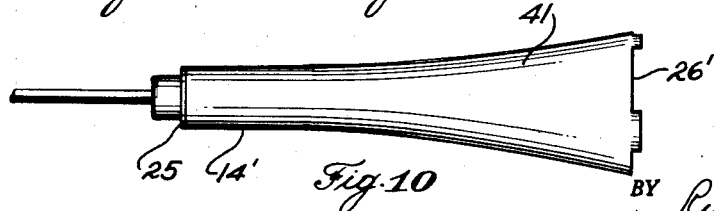
INVENTOR.
CECIL FARROW
BY Richey & Watts
ATTORNEYS Dec. 28, 1954  C. FARROW  2,697,936
SUPERSONIC TESTING OF HOT ARTICLES
Filed April 2, 1948  4 Sheets-Sheet 4

INVENTOR.
CECIL FARROW
BY Richey + Watts
ATTORNEYS

United States Patent Office 2,697,936
Patented Dec. 28, 1954

2,697,936

SUPERSONIC TESTING OF HOT ARTICLES

Cecil Farrow, Chagrin Falls, Ohio, assignor to Republic Steel Corporation, Cleveland, Ohio, a corporation of New Jersey Application April 2, 1948, Serial No. 18,664

26 Claims. (Cl. 73—67)

The present invention relates to flaw detection and location and concerns particularly the testing of hot pieces, such as steel or other metallic parts, which may be at white heat.

An object of the invention is to detect and locate flaws and defects in solid pieces without the necessity for allowing such pieces to cool before testing.

A further object of the invention is to permit metal articles, such as billets, slabs, blooms, skelps, plates, sheets and the like, to be tested while at high temperatures, such as of the order of 2000° F. or more. It is an object to provide for testing pieces directly after being received from the soaking pits, such as in a steel mill, or in the course of other processes in which it is desirable to maintain the metal at high temperature before carrying it to the next step in the manufacturing process, as in a rolling mill, for example.

Still another object of the invention is to detect and locate defective portions of metallic stock, especially carbon and alloy steels, while such stock is in initial form, such as billets or slabs for example, and before extensive further operations such as reduction to finished sheet or to tubing has taken place, in order to provide for removing such defective portions in the initial stock and prevent the formation of defective finished sheet or tube material or the like.

Furthermore, it is an object to conserve steel by accurately locating flaws in hot stock immediately after the first reduction of the ingot and to remove only those portions of the stock derived from the "pipe" in the ingot.

Other and further objects, features, and advantages of the invention will become apparent as the description proceeds.

Metallic articles of various shapes and sizes, composed of various metals such as carbon steel and alloy steel, for example, have been tested cold by means of supersonic waves for locating defects "such as pipes, bleeding," etc. Such methods are described in the papers presented by Messrs. Desch, Sproule, and Dawson, before The Iron and Steel Institute at London, received February 19, 1946, entitled "The Detection of Cracks in Steel By Means of Supersonic Waves," Paper No. 17/1946 of the Alloy Steels Research Committee (submitted by the Hair-Line Crack Sub-Committee). Quartz piezo-electric crystals are employed in such supersonic test apparatus as transmitting and receiving transducers. However, such piezo-electric crystals will not safely withstand the temperatures involved in the testing of stock in steel mills where it is desirable to test stock at a temperature of 2000° F. or more.

In carrying out the present invention, supersonic waves are employed in testing in a manner somewhat similar to that heretofore employed, but means are provided for avoiding direct thermal contact between the piezo-electric crystals or other signal transducers and the hot test piece or other parts which may reach elevated temperatures. To this end a signal conveying bar is interposed between the transducer and the hot test piece. Means are provided for avoiding extraneous reflections which would mask or cover the indications or defects. Furthermore, means are provided for continuously cooling the bar when necessary so that thermal conductivity through the bar to the hot test piece to the transducer is overcome.

It is recognized that the use of small blocks of steel or other material between a quartz crystal and the work being tested has been proposed for supersonic testing. The use of two such blocks, one for transmitting and the other for receiving supersonic pulses has been described in Paper No. 17/1946 of the Alloy Steels Research Committee previously mentioned. In carrying out the present invention bars are used sufficiently long so that cooling means may be interposed between a hot piece being tested and the end of the bar upon which the quartz crystal is fastened. Moreover, in carrying out the present invention a material is used which may be solid at ordinary room temperatures but which will be liquid at the temperature of the material being tested to furnish a liquid coupling medium between the intermediate signal conveying bar and the material being tested.

A better understanding of the invention will be afforded by the following detailed description considered in conjunction with the accompanying drawings, in which:

Fig. 5 is a view of a signal conveying bar having the surface treated to prevent reflections from lateral surfaces and showing the coaxial cable connections to the end thereof;

Fig. 6 is an enlarged view of a portion of the bar of Fig. 5 showing the nature of the surface;

Fig. 7 is a schematic diagram showing the arrangement for mounting and cooling the signal conveying bar and carrying electrical connections thereto without injury to electrical insulation;

Fig. 8 is an enlarged end view of the bar and piezo-electric crystal transducer;

Fig. 9 is an enlarged fragmentary side view of the end of the bar shown in Fig. 8 with electrical connections thereto;

Fig. 10 is a side view of a signal conveying or probe bar with lateral surfaces exponentially tapered to minimize signal reflections therefrom; and Fig. 11 is a view of the end of the bar of Fig. 10 which is adapted to rest against the surface of the hot piece to be tested.

Like reference characters are utilized throughout the drawing to designate like parts.

Figure 1:
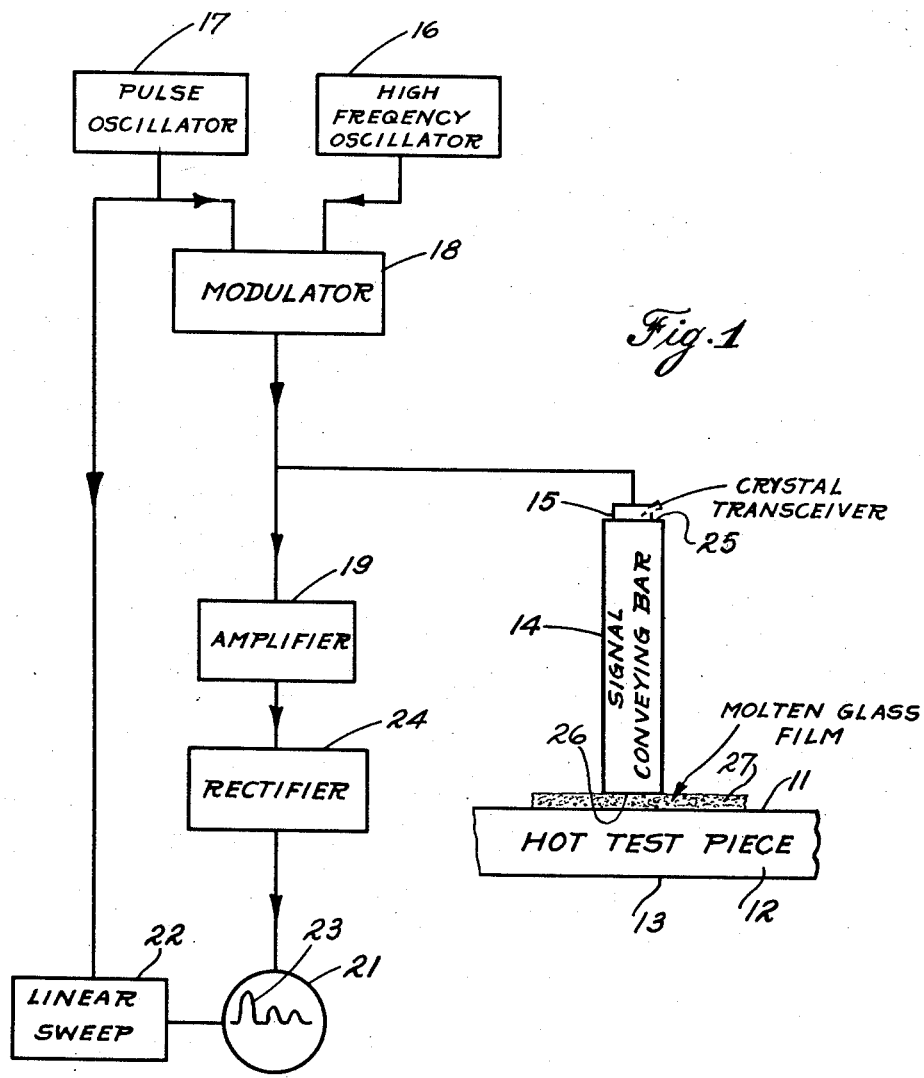
Fig. 1 is a block diagram schematically illustrating an embodiment of the invention.

According to the illustrative manner of procedure schematically indicated in Fig. 1 of the drawing, supersonic waves are transmitted through one surface 11 of a hot test piece 12, such as a slab or a billet, for example, at white heat. An observation is made to ascertain whether any reflections of the supersonic waves occur between the time of reflection of the waves from the front surface 11 of the test piece and the rear surface 13 of the test piece. In order that such supersonic waves may be transmitted into the test piece and reflected therefrom, without destroying the transmitting and detecting apparatus as a result of the high temperature of the test piece 12, a signal conveying bar 14 is interposed between the signal transducer means 15 and the test piece 12. The invention is not limited to a specific means for producing or detecting the test signals. However, satisfactory results have been obtained by the employment of piezo-electric quartz crystals both as the signal generating transducer and the signal detecting transducer. A separate generator and receiver at or near the end of the bar 14 remote from the test piece 12 may be employed. However, the apparatus is simplified by utilizing a single quartz crystal 15 as both the signal generator and the signal reflection detector. Accordingly, for the sake of simplifying the description and drawings, there is shown and described only the illustrative arrangement in which a single crystal 15 arranged as a transceiver serves both to generate signals and to detect reflections thereof.

Preferably the signals are produced in wave trains or pulses in order to simplify the separation and identification of the transmitted signals, the signals reflected from the front and rear surfaces of the test piece 13, and reflections resulting from defects in the test piece. For observation of the wave trains the representations thereof are produced on an oscilloscope screen. A conventional electron tube apparatus is employed for producing the wave trains for exciting the transceiver 15, for amplifying the reflected signals received by the transceiver 15, and for producing suitable deflections of the beam of the cathode ray oscilloscope to represent such signals. Since such electronic apparatus and cathode ray oscilloscope employed are well known devices to those skilled in the art, they have been represented schematically in diagrammatic form in Fig. 1.

In the system shown by way of illustration, the control and amplifying apparatus comprises a high-frequency oscillator 16, determining the frequency of the supersonic wave, a pulse oscillator 17 for determining the duration and interval between trains of waves, a modulator 18 controlled by the units 16 and 17 for exciting the crystal transceiver 15 in accordance with the pulses or trains of waves desired to be transmitted to the signal conveying bars 14, an amplifier 19 for sufficiently increasing the strength of received reflected signals to cause deflection of the beam of a cathode ray oscilloscope represented by its screen 21, and a linear sweep circuit suitably synchronized with the generated wave trains by a coupling to the pulse oscillator 17 for spreading the oscilloscope trace horizontally on the oscilloscope screen 21. If desired, a rectifier 24 may be interposed between the amplifier 19 and the vertical deflection circuit of the oscilloscope, but I have found that satisfactory observations may also be made without the rectifier 24 by observing the envelope of the wave trains.

The transceiver crystal 15 is brought into contact with one end surface 25 of the signal conveying bar 14 and the opposite end surface 26 of the bar is brought into signal transmitting relationship to the surface 11 of the test piece 12. Owing to the difficulty of making perfect surface contact with the test piece which may have no perfect plane surface, especially in the case of a hot test piece which is at white heat and may be covered with scale, it is desirable to interpose a signal transmitting medium between the confronting surfaces 26 and 11 of the signal conveying bar 14 and the hot test piece 12. For this purpose I have found a material to be satisfactory which forms a fluid film at the temperature involved. For example, a film of molten glass such as lead silicate may be carried on the confronting surface of the bar. A film of some other suitable molten inorganic salt such as barium sulphate may also be used. Such inorganic salts fuse at temperatures below white heat but remain in viscous molten condition at white heat. A film of oil or the like may be interposed between the crystal 15 and the upper end surface 25 of the signal conveying bar 14; however, greater sensitivity and reliability are obtained by cementing the crystal 14 to the surface 25. For example, a thin film of sodium silicate may be employed for cementing. As will be described more in detail hereinafter, suitable means are provided for avoiding difficulty which might be caused by random reflections of transmitted signals from lateral surfaces of the signal conveying bar 14. Likewise, means are provided for cooling the bar 14 to prevent the quartz crystal 15 from being heated by conduction through the bar 14, and suitable means are provided for making electrical connections to the faces of the crystal 15 which shall remain adequately insulated for the high frequencies employed at the temperature to which the apparatus may be subjected.

The optimum frequency for the supersonic waves, determined by the frequency of the generator 16, depends upon the physical dimensions of the test piece 12 and the depth of the defects which may be expected. For example, the thickness of the piece 12 should be large in comparison with the wave length of the supersonic waves and the facility of observing indications of defects is enhanced if the size of the defect is as great or greater than the wave length of the supersonic waves. In connection with the testing of hot slabs and billets, ranging from one inch to several inches in thickness, for cracks and flaws such as result from pipes in the ingots, it has been found satisfactory to employ a frequency of the order of two and one-quarter megacycles per second. The pulse length or length of the wave train may, for example, be from one to eight micro-seconds and the pulse frequency may, for example, be approximately sixty pulses per second.

The manner of both detecting presence of the defect and ascertaining its location is as follows: A suitable film forming material, such as lead-silicate, is sprinkled upon the surface 11 of the hot test piece 12 and, as a result of the high temperature thereof, the film forming material melts and forms a viscous fluid film 27. The lower end surface 26 of the signal conveying bar 14 is then brought in contact with the surface 11, resulting in the formation of the film 27 joining confronting surfaces 26 and 11. The electronic generating unit having been started, electrical impulses transmitted to the opposite faces of the crystal transceiver 15 causes the crystal to be set in vibration in wave trains responding to the electrical wave trains applied thereto, and such supersonic mechanical vibration of the crystal 15 causes the transmission of longitudinal supersonic waves through the bar 14. Transverse and surface waves may also be produced as the result of the shape of the bar 14, and depending upon the means provided for absorbing or preventing reflections from the lateral surface.

The supersonic vibrations, or signals, upon striking the lower end surface 26 of the bar 14, are in part reflected from the lower end surface 26 of the bar 14 and in part transmitted through the test piece 12. Upon striking the surface 13, the vibrations are reflected. Assuming the absence of any defects in the test piece 12, there will be two trains of reflected vibrations for each wave train of transmitted vibrations. Such wave trains will, of course, be reflected back and forth from the surface 25 of the bar 14 and the surfaces 11 and 13 of the test piece 12, so that there is actually a continued series of progressively lower amplitudes of vibration. The later reflections may, however, be disregarded.

Figure 2:
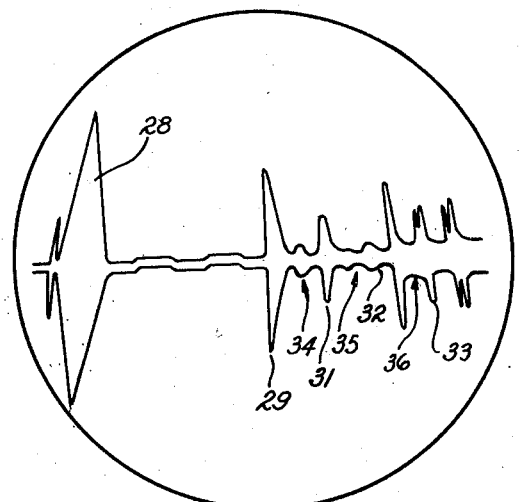
Fig. 2 is a view representing the trace on an oscilloscope screen when a defect is indicated by the apparatus of Fig. 1 when operated without a rectifier.

If there is a defect in the test piece, reflections will also take place from the defect and may be observed between the reflection from the front and rear surfaces 13 of the test piece 12. This is shown, for example, in Fig. 2, which is a reproduction of the wave trace on a screen of the oscilloscope, produced by the reflected vibrations or signals received by the crystal transceiver 15 and the amplifier 19. The drawing shows the actual envelope of the vibration, the rectifier 24 not having been employed in producing the oscilloscope images in Figs. 2, 3 and 4. Referring to Fig. 2, the envelope of the initial pulse is shown at 28. The reflection from the end surface 26 of the bar 14 and the confronting surface 11 of the hot test piece 12 appears at 29, but in slightly diminished amplitude, and the reflection from the back of the test piece is shown at 31. The later reflections from the back of the test piece are shown at 32 and 33. If a small defect is present, reflections will be shown, such as at 34, 35 and 36. The first reflections are obviously the strongest and most easily observed and the location thereof may be ascertained more accurately. Accordingly, if desired, the length of sweep produced by the sweep generator 22 may be so adjusted as to eliminate most of the later reflections and to spread across the oscilloscope screen, that portion of the oscilloscope trace including the first reflection 29 from the front surface of the test piece and the first reflection 31 from the back surface of the test piece. If any reflections occur between these two reflections, such as reflection 34, it is an indication of a defect in the test piece somewhere between the front and rear surfaces, such as a crack, void, hole, or other defect. By suitably calibrating the oscilloscope, the thickness of a test piece may be measured by observing the distance between the front and rear reflections 29 and 31, and the location of the defect in terms of its distance from these two surfaces may be ascertained by observing the location of an indication 34 of a defect.

Figure 3:
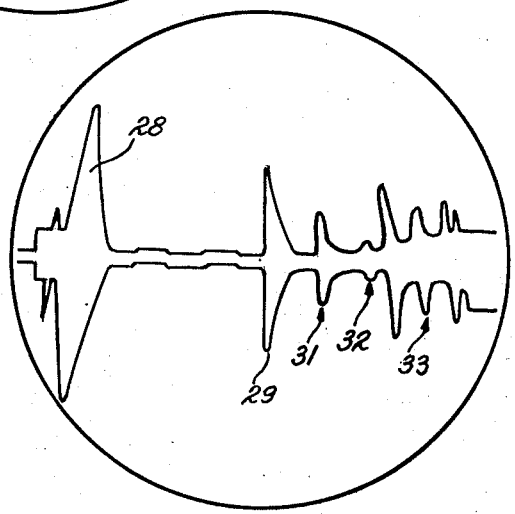
Fig. 3 is a corresponding view when no defect is present.

In case the test article is free from defects and the linear sweep adjustment is the same as that producing the wave responses shown in Fig. 2, an image upon the oscilloscope screen will be obtained such as shown in Fig. 3, where successive reflections from the back surface of the test specimen are shown at 31, 32, and 33; but there is no reflected wave corresponding to the waves 34, 35 and 36 of Fig. 2 resulting from a defect. In case of a more serious defect, an indication may be obtained, such as in Fig. 4, where not only the first reflection 37 but also the second reflection 38 of the defect appears with considerable amplitude.

Figure 12:
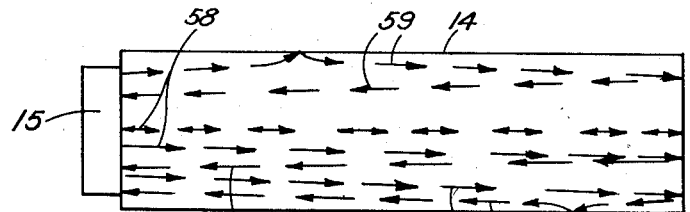
Fig. 12 is a longitudinal section of a non-treated signal-conveying bar showing hypothetical paths of supersonic waves responsible for multiple reflections from the end of the bar.
Figure 15:
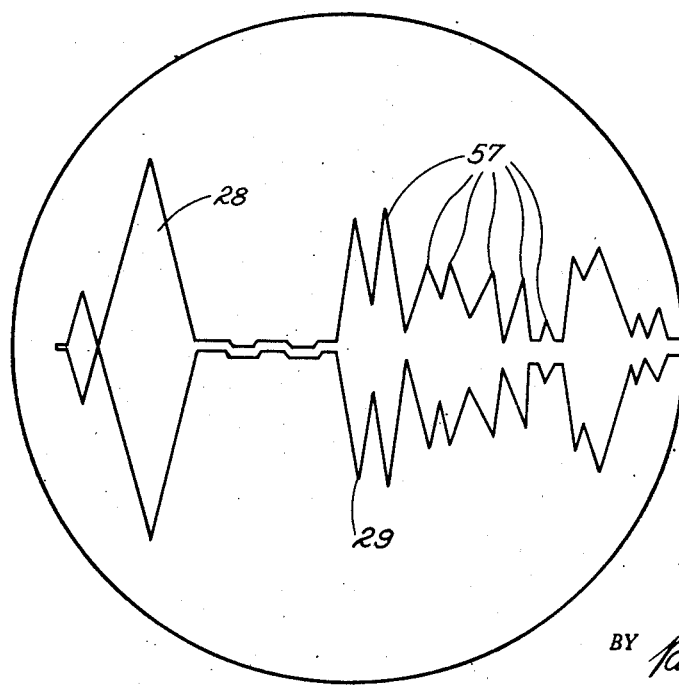
Fig. 15 is a view representing the trace on an oscilloscope screen when an untreated bar is used, whether or not a defect is present.

If a plain cylindrical bar 14 of reasonable diameter be used for the signal conveying bar, it may be found that the space occupied by reflections 31 and 32 from the opposite side of the test piece 12 and by reflections 34, 35 from the defects within this test piece will be occupied by a series of reflections from the end 26 of the signal conveying bar 14 as shown in Fig. 15 at 57. The reason for such multiple reflections from the end 26 of the signal conveying bar 14 is not clearly known. According to one hypothesis, they result from parts of the beam of supersonic pulses striking the cylindrical surface of the bars and following longer paths as shown in Fig. 12. These longer paths are supposed to result in alternate reinforcement and interference of the supersonic waves to produce the effect shown in Fig. 15. This is indicated diagrammatically in Fig. 12. Lines 58 represent paths which may be traversed by supersonic energy which does not reach the sides of the bar. Lines 59 represent hypothetical paths of supersonic energy reflected from the sides of an untreated signal conveying bar. Lines 59 are shown curved near the surface of the bar due to the probable refraction occurring due to decreased velocity of the supersonic energy in this region. According to other hypotheses, these multiple reflections may be produced by a surface wave or a series of surface waves travelling along the cylindrical surface of the bar. It is known that such surface waves travel at a lower velocity than do waves in the main part of the bar. Thus a surface wave travelling along the cylindrical surface of the bar would produce a reflection at some later time than the first reflection due to the main wave travelling through the center of the bar. An additional mode of transmission which may be produced is the change of a longitudinal compression tension wave into a shear wave at the surface of the bar. Such a shear wave travels at approximately one-half the velocity of the main compression tension wave travelling through the center of the bar. It is possible that any one or all of these hypotheses may be correct and that all of the effects contribute to the multiplicity of reflections.

Owing to the possibility of various modes of transmission of supersonic waves through the bar 14, previously alluded to, and the possibility of reflections also from the cylindrical surfaces of the bar 14, difficulty of interpretation of the significance of the wave traces on an oscilloscope screen might be produced if care were not taken to avoid response of the crystal 15 to multiple reflections caused by the cylindrical surfaces of the signal conveying bar 14. The test is conducted in such a manner that supersonic vibrational energy is prevented from reaching the cylindrical surface or is absorbed upon reaching this surface. For example, as shown in Figs. 5 and 6, the cylindrical surface of the bar 14 is covered with randomly placed indentations, such as punch marks 39, which make the surface so irregular as to cause interference between reflections from adjacent portions of the lateral surface, thereby in effect absorbing or deadening such reflections from the lateral surface.

Figure 4:
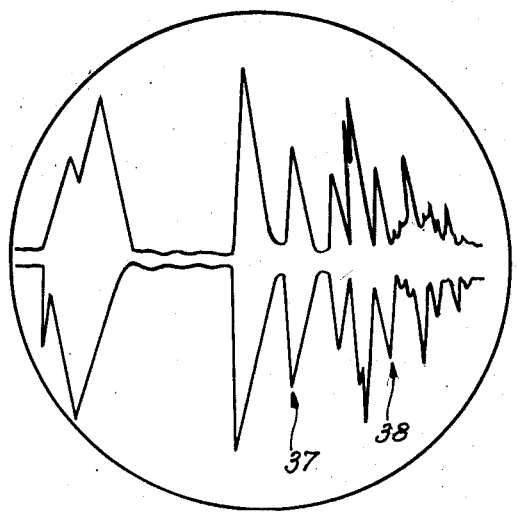
Fig. 4 is a corresponding view with a more serious defect indicated.
Figure 13:
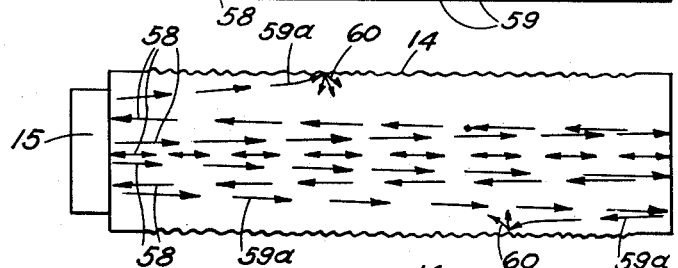
Fig. 13 is a longitudinal section of a signal conveying bar with the surface treated to absorb or scatter supersonic vibration showing how multiple reflections may be avoided by this treatment.

Fig. 13 illustrates one theory about the effect of a rough surface, such as produced by punch marking the surface of a bar, which avoids the undesired multiple reflections. As before, lines 58 indicate hypothetical paths of the supersonic energy which does not reach the surface of the bar. Lines 59a represent paths of supersonic energy which does reach the surface of the bar. However, in this case, the rough surface causes the supersonic energy to be dispersed as shown at 60 so that multiple reflections do not show on the oscilloscope. In this case, patterns such as shown in Figs. 2, 3 and 4 may be interpreted in terms of presence or absence of flaws in the piece being tested. Alternatively, an absorbing layer may be provided on the surface of the bar by coating it with a layer of fused lead silicate or a layer of powdered metal sintered to the surface of the bar.

Figure 14:
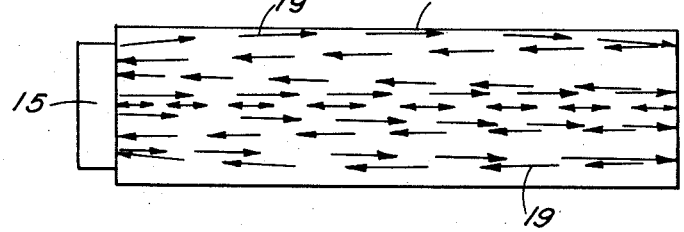
Fig. 14 is a longitudinal cross-section of a bar in which the surface layers have a higher velocity of transmission of supersonic pulses than the interior of the bar, in order to provide a focusing effect that prevents multiple path reflections and more effectively utilizes the supersonic energy.

It can be calculated from the theory of transmission of supersonic vibration through a bar that the velocity of transmission is greatest near the center of the bar and begins to decrease as the surface of the bar is approached. This results in a refraction of the beam tending to direct the supersonic energy outward toward the cylindrical surfaces of the bar. This is indicated in Figs. 12 and 13 as previously mentioned. This refracting effect may be reversed by providing outer layers of the bar which have higher velocity of transmission than is normally present. This may be done, for example, by cold working the surface of the bar to produce compressive stresses to increase the velocity of supersonic transmission. It may also be done by providing a bar whose outer layers are composed of some material having a higher velocity of transmission than the interior of the bar. Preferably, there should be no sharp line of demarcation between the interior of the bar and the higher velocity layers on the outside of the bar. When such outer layers of higher velocity are provided, any of the supersonic beam energy which approaches the exterior surface of the bar is caused to be bent inward slightly, producing in effect a focusing of the supersonic beam. This theory is illustrated in Fig. 14, which shows paths 61 bent slightly inward as they approach the surface of the bar. In this case, since the supersonic energy is effectively kept away from the surface of the bar, the distortion or multiple reflections from the end 26 of the bar are eliminated. This focusing effect also provides for a more efficient utilization of the supersonic energy.

When employing a probe bar having the signal transducer means for generating and receiving the supersonic vibrations at the same end of the bar, difficulty from lateral reflections may also be overcome by so shaping the lateral surface of the bar so as to prevent such reflections from returning to the end at which the signal transducer means are mounted. For example, as shown in Fig. 10, a probe bar 14' may be employed having a lateral surface 41 tapering outwardly from the transducer end surface 25 to the test piece end surface 26'. Suitable results are obtained, for example, where the surface tapers according to exponential law.

Where the specimen contacting surface of the probe bar 14 is enlarged, as shown in Fig. 10, it may be desirable to interrupt the continuity of the contacting surface by providing slots or other irregularities in the contacting surface, as shown in Figs. 10 and 11. For example, as shown more particularly in Fig. 11, the primary contact with the surface 11 of the hot test specimen 12 is made by a central circular portion 42 of the end 26 of the probe bar, and intermediate portions 43 between the portion 42 and the edge portions 44 are cut away.

Owing to the high electrical frequencies employed in exciting the crystal 15, electrical connections thereto are preferably made through a coaxial line conductor or a concentric cable. It is to be understood that in employing piezoelectric crystals, electrical connections are made to the opposite faces or surfaces thereof. Thus, as shown in Fig. 9, one surface of the crystal 15, being cemented to the end surface 25 of the signal conveying or probe bar 14, makes electrical contact therewith, or may be said to be grounded thereto. The outer surface 45 is silvered or otherwise prepared with conducting material to serve as an ungrounded terminal. For example, as shown in Fig. 9, a phosphor-bronze spring 46 or a cat whisker 47 may be provided for making contact with the ungrounded terminal surface 45 of the crystal 15. In order to minimize difficulties with high frequency insulation in proximity to the heat radiated from the test piece 12, the probe bar 14 is preferably mounted at the end of a hollow pipe 48 of copper or other conducting material serving both as a handle for the test probe and as the outer conductor associated with a concentric center rod 49 to form a coaxial line. The spring 46 is mounted at the inner end of the center rod 49 and the probe end of the outer conductor 48 is grounded to the probe bar 14, as shown in Fig. 9. If desired, a joint 51 may be provided, as shown in Fig. 7, or a swivel joint may be employed with a portion of the rigid bar 48 replaced by circular copper braiding. The conventional type of flexible coaxial cable 52 may be connected in a suitable manner at the end of the pipe 48 remote from the probe bar 14.

To insure the maintenance of the upper end of the probe bar 14 at a sufficiently low temperature to avoid injuring the crystal 15, a cooling chamber 53 is provided around the bar 14 joined to water inlet and outlet tubes 55 and 56 respectively. The cooling chamber 53 may be secured to the pipe 48 to form a unitary assembly.

While the invention has been described with particular reference to the testing of hot articles, it is realized that it may have application in the testing of cold articles. This is especially true when testing for defects lying close to the surface. The initial pulse 28 shown in Fig. 2 is usually of such magnitude as to paralyze the amplifier 19 of Fig. 1 for a period which may be long enough to prevent the reflection from a defect near the surface of the test piece from being shown. When the signal conveying bar as shown is used, there is a period of several microseconds duration before the pulse 29 reflected from end 26 of signal conveying bar 14 reaches the amplifier. Experiments have shown that on cold steel the acoustic impedance of the signal conveying bar 14 may be closely enough matched to the sample being tested that the pulse 29 is considerably reduced in size below the level of the initial pulse 28. This results in the amplifier 19 being paralyzed for a shorter period of time and allows the detection of defects closer to the surface of the test piece.

Moreover, the signal coupling bar serves the purpose of a delayed transmission line between the supersonic instrument and the quartz crystal transducer. I have found such delay means to be useful in facilitating determination of the effectiveness of coupling between the bar and the specimen being tested. The size of the first back reflection from the end of the signal coupling bar decreases as coupling between the bar and the specimen increases in effectiveness. This gives a very good visible indication on the cathode ray oscilloscope of the effectiveness of this coupling. This can be especially important in testing a piece of such shape that the back reflection from the opposite side of the piece does not return to the transducer. In such a case the operator of equipment heretofore in use had no means of knowing whether absence of signals meant defect-free material or was due to poor contact between the quartz crystal transducer and the piece being tested.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. A method of locating flaws in a hot solid piece at a temperature exceeding the temperature withstood by a supersonic transducer, comprising the steps of transmitting supersonic signals in pulses from a transducer through a signal conveying bar from one end while holding the opposite end of the bar against the surface of a hot solid piece to be tested, fusing a solid material and maintaining a fused layer of such material between adjacent surfaces of said signal-conveying bar and the test piece, producing a graphic indication of the transmitted supersonic signal which has been reflected from the end of the signal conveying bar back to the transducer, and comparing the location of the indication of a supersonic signal reflected from a flaw in the test piece with the location of the indication of the signal which has been reflected from the end of the signal conveying bar.

2. The method of claim 1 including the step of continuously cooling the signal conveying bar to prevent the transfer of excessive heat to the transducer.

3. A test probe for use in supersonic testing apparatus for a hot test piece, comprising in combination a signal conveying bar having first and second surfaces at opposite ends of the bar and being adapted to be brought in proximity at the first end surface to the surface of a hot piece to be tested, a film at the said first end surface, said film comprising a material having a melting point above ambient temperature, and signal transducer means mounted at the second surface of said signal conveying bar, adapted to be connected to signal generating and signal indicating means.

4. Apparatus as in claim 3 wherein the signal conveying bar has lateral surfaces covered with indentations for absorbing supersonic signals and preventing reflections from such surfaces.

5. Apparatus as in claim 3 wherein the signal conveying bar has a lateral surface including a multiplicity of relatively small deformations for substantially absorbing supersonic signals and preventing reflections therefrom.

6. Apparatus as in claim 3 wherein the signal conveying bar is tapered with a cross section increasing from the transducer end to the test piece end for minimizing signal reflections from the lateral surfaces of the signal conveying bar.

7. A testing apparatus for a hot test piece comprising in combination a signal generator, a signal conveying bar adapted to be disposed with one end against the surface of a hot piece to be tested, a fusible material carried by the said first end surface, comprising a material having a melting point substantially above ambient temperature and having the property of remaining molten at white heat, a signal transducer at the opposite end of said signal conveying bar, connections from said signal generator to said transducer, and signal indicating means also connected to said transducer.

8. Apparatus as in claim 3 including a length of relatively rigid concentric conductor line, comprising a conductor tube grounded to the said bar and a center conductor insulated therefrom, electrically connected to one electrical terminal of said signal transducer means, the second terminal of said signal transducer means being also grounded to the bar, and circulating fluid lines carried along and supported by said rigid concentric line with a fluid chamber connected to said fluid lines surrounding said bar.

9. In the method of employing a supersonic signal transducer for detecting flaws in a piece to be tested at a temperature exceeding the temperature withstood by the signal transducer, comprising the steps of forming a fused film on the surface of the piece to be tested, interposing a solid medium between said film and the signal tranducer, and utilizing the solid medium and fused film as a coupling device for the transmission of waves between the transducer and the piece to be tested.

10. In the method of employing a supersonic signal transducer for detecting flaws in a piece to be tested at a temperature exceeding the temperature withstood by the signal transducer, comprising the steps of forming a fused film on the surface of the piece to be tested, interposing a solid medium between said film and the signal transducer, utilizing the solid medium and fused film as a coupling device for the transmission of waves between the transducer and the piece to be tested and continuously cooling the solid medium to prevent the transfer of excessive heat to the transducer by circulating a cooling fluid over and in contact with the solid medium.

11. In the supersonic testing for flaws of a hot solid test piece at a temperature exceeding the temperature withstood by a supersonic signal transducer, the steps of fusing a solid material, transmitting a signal through a bar and a fused layer of such material from a transducer to a hot piece to be tested, receiving signals reflected back through the fused layer and the bar from the test piece to the transducer, and comparing the time of reception of signals reflected from the end of the bar with the time of reception of signals reflected from flaws or discontinuities in the test piece.

12. Apparatus as in claim 3 wherein the signal conveying bar has cold worked outer layers to increase the velocity of supersonic signals in said outer layers and thereby minimize signal reflections from the lateral surfaces of the bar.

13. Apparatus as in claim 3 wherein the outer portion of the signal conveying bar is composed of a material having a higher supersonic transmission velocity than the material in the inner portion of said bar.

14. Apparatus as in claim 3 wherein the outer portion of the signal conveying bar is composed of a material having physical properties such that a supersonic signal has different velocities in the outer and inner portions of said bar for the same mode of transmission.

15. Apparatus as in claim 3 wherein the lateral surface of the signal conveying bar is coated with a nonhomogeneous material having a supersonic transmission velocity differing from the transmission velocity in the bar.

16. The method of employing a supersonic signal transducer for detecting flaws in a relatively hot piece to be tested, comprising the steps of forming a fused film of normally solid material and molten at the temperature of the piece on the surface of the piece to be tested, interposing a solid medium between said film and said signal transducer, utilizing the solid medium and the film for the transmission of supersonic vibrations between the transducer and the piece to be tested, and focusing the supersonic vibrations in the solid medium into a path substantially parallel to the line between the said fused film and said signal transducer to minimize the interference effect at the transducer of random reflections in the solid medium.

17. The method of testing a hot solid body at glowing temperature for the presence of flaws, comprising the steps of fusing a solid material, interposing a solid medium and a fused layer of such material between the supersonic transducer and the surface of the solid body to be tested, energizing the supersonic transducer and producing indications of supersonic energy reflected from a flaw in the body and transmitted back through said fused layer and said solid medium.

18. The method of testing a solid body for the presence of a flaw, comprising the steps of fusing a solid medium, generating electrical energy of supersonic frequency, applying said electrical energy of supersonic frequency to a transducer to convert said electrical energy into mechanical vibrational energy of supersonic frequency, transmitting said mechanical energy of supersonic frequency through a signal conveying bar and said fused medium to the surface of the solid body being tested and thence into said solid body, and thence through the fused medium and the signal conveying bar to the supersonic transducer, converting vibrational energy reflected by discontinuities in the solid body to electrical energy by means of the supersonic transducer and converting said electrical energy into observable signals.

19. In the art of supersonic testing for flaws in a hot solid piece at a temperature exceeding the temperature withstandable by a supersonic transducer, the steps of applying to said piece a substance adapted to be fused under the heat of the piece and thus to provide a viscous film thereon, impressing one end of a solid bar against said film while transmitting supersonic signal impulses from a transducer through said bar from the end opposite said film, and simultaneously producing a graphic indication of the impulses reflected from the end of said solid bar and from any flaw within the piece.

20. The method of employing a supersonic signal transducer for detecting flaws in a test piece at a temperature beyond the temperature withstood by the transducer, comprising the steps of forming a fused film on the surface of the piece to be tested by applying to said piece a normally solid substance adapted to be fused under the heat of the piece, interposing a solid medium between said film and said signal transducer, utilizing the solid medium and the film for the transmission of supersonic vibrations between the transducer and the piece to be tested, and focusing the vibrations in the solid medium into a path substantially parallel to the line between the said fused film and the said signal transducer to minimize the interference effect at the transducer of random reflections in the solid medium.

21. Apparatus for the supersonic testing of pieces at temperatures beyond the operating temperature of a supersonic transducer comprising, in combination, a signal conveying bar for spacing the transducer from the test piece, the bar having a first and a second end surface, transducer means mounted at the second surface of the bar and adapted to be connected to signal generating and indicating means, the bar being adapted to be brought into proximity at the first end surface to the surface of the piece to be tested and the end surface having in contact therewith a fused film of a normally solid substance adapted to be fused at a temperature below white heat and remaining molten at white heat and adapted for the transmission of supersonic vibrations while in the molten condition to facilitate the transmission of signals between the conveying bar and the piece to be tested.

22. Apparatus for the supersonic testing of pieces at temperatures beyond the operating temperature of a supersonic transducer comprising, in combination, a signal conveying bar for spacing the transducer from the piece, the bar having a first and a second surface, transducer means mounted at the second surface of the bar and adapted to be connected to signal generating and indicating means, the bar being adapted to be brought into proximity at the first end surface to the surface of the piece to be tested and the first end surface of the bar having in contact therewith a fused film of molten inorganic salt, the salt being adapted to transmit supersonic vibrations while in the molten condition to facilitate the transmission of signals between the conveying bar and the piece to be tested.

23. Apparatus for the supersonic testing of pieces at temperatures beyond the operating temperature of a supersonic transducer comprising, in combination, a signal conveying bar for spacing the transducer from the test piece, the bar having a first and a second surface, transducer means mounted at the second surface of the bar and adapted to be connected to signal generating and indicating means, the bar being adapted to be brought into proximity at the first end surface to the surface of the piece to be tested and the end surface of the bar having in contact therewith a fused film of lead silicate on the said first surface to facilitate the transmission of signals between the conveying bar and the piece to be tested.

24. Apparatus for the supersonic testing of pieces at temperatures beyond the operating temperature of a supersonic transducer comprising, in combination, a signal conveying bar for spacing the transducer from the test piece, the bar having a first and a second surface, transducer means mounted at the second surface of the bar and adapted to be connected to signal generating and indicating means, the bar being adapted to be brought into proximity at the first end surface to the surface of the piece to be tested and the end surface of the bar having in contact therewith a fused film of barium sulfate on the said first surface to facilitate the transmission of signals between the conveying bar and the piece to be tested.

25. Apparatus for the supersonic testing of pieces at temperatures beyond the operating temperature of a supersonic transducer comprising, in combination, a signal conveying bar for spacing the transducer from the test piece, the bar having a first and a second end surface, transducer means mounted at the second surface of the bar and adapted to be connected to signal generating and indicating means, the bar being adapted to be brought into proximity at the first end surface to the surface of the piece to be tested and the first end surface having in contact therewith a fused film of normally solid substance adapted to be fused at a temperature below white heat for transmitting supersonic vibrations between the bar and the work piece, and means for cooling said signal conveying bar comprising fluid conveying means surrounding at least a portion of said bar.

26. A test probe for use in supersonic testing apparatus of a hot test piece from a point spaced from the piece comprising, in combination, a signal conveying bar having first and second surfaces at opposite ends of the bar and being adapted to be brought into proximity at the first end surface to the surface of a hot piece to be tested, signal transducer means mounted at the second surface of said signal conveying bar, including a length of relatively rigid concentric conductor line comprising a conductor tube grounded to the said bar and a center conductor insulated therefrom, electrically connected to one electrical terminal of said signal transducer means, the second terminal of said signal transducer means being also grounded to the bar, and circulating fluid lines carried along and supported by said rigid concentric line with a fluid chamber connected to said fluid lines surrounding said bar.

References Cited in the file of this patent

UNITED STATES PATENTS

| Number | Name | Date |
|---|---|---|
| 1,158,967 | Bellingham | Nov. 2, 1915 |
| 1,529,520 | Watkins | Mar. 10, 1925 |

(Other references on following page)

UNITED STATES PATENTS

| Number | Name | Date |
|---|---|---|
| 1,962,210 | Osnos | June 12, 1934 |
| 2,367,866 | Humphreys et al. | Jan. 23, 1945 |
| 2,431,233 | Erwin | Nov. 18, 1947 |
| 2,448,399 | Shaw | Aug. 31, 1948 |
| 2,467,301 | Firestone | Apr. 12, 1949 |
| 2,505,515 | Arenberg | Apr. 25, 1950 |

FOREIGN PATENTS

| Number | Country | Date |
|---|---|---|
| 352,040 | Great Britain | June 29, 1931 |
| 852,150 | France | Oct. 16, 1939 |